(12) United States Patent
Embrey et al.

(10) Patent No.: US 7,656,131 B2
(45) Date of Patent: Feb. 2, 2010

(54) METHODS OF CHARGING BATTERY PACKS FOR CORDLESS POWER TOOL SYSTEMS

(75) Inventors: Janet M. Embrey, Fallston, MD (US); Danh T. Trinh, Parkville, MD (US)

(73) Assignee: Black & Decker Inc., Newark, DE (US)

( * ) Notice: Subject to any disclaimer, the term of this patent is extended or adjusted under 35 U.S.C. 154(b) by 344 days.

(21) Appl. No.: 11/553,742

(22) Filed: Oct. 27, 2006

(65) Prior Publication Data

US 2007/0103113 A1     May 10, 2007

Related U.S. Application Data

(60) Provisional application No. 60/731,500, filed on Oct. 31, 2005.

(51) Int. Cl.
*H02J 7/04* (2006.01)
*H02J 7/16* (2006.01)

(52) U.S. Cl. .................... 320/162; 320/139; 320/152; 320/157

(58) Field of Classification Search ............... 320/127, 320/128, 134–137, 148, 150, 152, 153, 155, 320/157–158, 160, 162, 163
See application file for complete search history.

(56) References Cited

U.S. PATENT DOCUMENTS

| 5,703,466 | A | * | 12/1997 | Honda et al. | ................ 320/152 |
| 5,982,152 | A | * | 11/1999 | Watanabe et al. | ........... 320/150 |
| 6,268,710 | B1 | * | 7/2001 | Koga | ........................... 320/116 |
| 2004/0086784 | A1 | * | 5/2004 | Barker et al. | ............ 429/231.5 |
| 2004/0113587 | A1 | * | 6/2004 | Bohne et al. | ................ 320/128 |
| 2005/0264263 | A1 | * | 12/2005 | Tsenter | ........................ 320/128 |

* cited by examiner

*Primary Examiner*—Edward Tso
*Assistant Examiner*—Ahmed Omar
(74) *Attorney, Agent, or Firm*—Harness, Dickey & Pierce, P.L.C.

(57) ABSTRACT

In a method of charging a battery pack, the pack is inserted in a charger and an initial set of checks of cell voltage and pack temperature is performed. Once the initial set of checks is satisfied, the cells may be charged at a first constant current level. The first constant current level is adjusted to one or more lower levels of constant current until cell voltages of all the cells are within a full charge voltage window. The voltage window is defined between a minimum full charge cell voltage level and a maximum full charge cell voltage level. The charge may be terminated once all of the cells are within the full charge voltage window.

20 Claims, 11 Drawing Sheets

METHODS OF CHARGING BATTERY PACKS FOR CORDLESS POWER TOOL SYSTEMS

PRIORITY STATEMENT

This U.S. non-provisional patent application claims the benefit under 35 U.S.C. §119(e) to U.S. Provisional Patent Application Ser. No. 60/731,500, filed Oct. 31, 2005, the entire contents of which are hereby incorporated by reference herein.

BACKGROUND

1. Field

Example embodiments relate generally to methods of charging battery packs for cordless power tools.

2. Description of Related Art

Conventional charge algorithms for Li-ion battery packs typically employ a constant current/constant voltage (CC/CV) charge algorithm in which the charge current is held at a constant level for a period of time, while the battery pack increases in voltage to a set voltage threshold level, typically about 90% state of charge. At that point, the pack voltage is maintained at a constant voltage level while the current gradually decreases to a lower level so as to complete the charge.

For charging conventional Li-ion battery packs, the power supply (charger) supplying the charging current to the battery pack needs to maintain (at different times in the charge) a constant voltage and/or a constant current. This requires complicated or complex charge circuitry, especially when charging a battery pack with a number of serially connected cells with voltages of each cell potentially being at different levels. This constant current/constant voltage (CC/CV) charge algorithm is typically applied to conventional Li-ion battery packs which have cell chemistries such as lithiated cobalt oxide, lithiated nickel oxide, lithiated manganese oxide spinel, and mixtures of same or other lithiated metal oxides.

SUMMARY

Example embodiments of the present invention are directed to methods of charging a battery pack. In one example, the pack is inserted in a charger and an initial set of checks of cell voltage and pack temperature is performed. Once the initial set of checks is satisfied, the cells may be charged at a first constant current level. The first constant current level is adjusted to one or more lower levels of constant current until cell voltages of all the cells are within a full charge voltage window. The voltage window is defined between a minimum full charge cell voltage level and a maximum full charge cell voltage level. The charge may be terminated once all of the cells are within the full charge voltage window.

In another example embodiment, an initial set of checks of cell voltage and pack temperature with zero charge current applied is performed after inserting the battery pack into the charger. Cells are then charged at an initial charge current level once the initial set of checks is satisfied to perform a second set of voltage and temperature checks. Once the second set of checks is satisfied, the cells are charged at a first constant current level that is higher relative to the initial charge current level used for the second checks. Upon reaching a first transition limit, charge current is reduced to a second constant current level lower than the first. Upon reaching a second transition limit, charge current is reduced to a third constant current level lower than the second. Individual cells may be selectively discharged at the third constant current level while other cells continue to charge. The charge may be terminated once all cells are within a full charge voltage window between a minimum full charge cell voltage level and a maximum full charge cell voltage level.

BRIEF DESCRIPTION OF THE DRAWINGS

Example embodiments will become more apparent by describing, in detail, example embodiments thereof with reference to the attached drawings, wherein like procedures are represented by like reference numerals, which are given by way of illustration only and thus do not limit the present invention.

DETAILED DESCRIPTION OF EXAMPLE EMBODIMENTS

Prior to describing the example battery charge methodologies, the inventors initially provide with reference to FIGS. 1-9 an overview of a cordless power tool system including an example battery pack and battery charger, an example block diagram between pack and charger and example cell configurations with the battery pack of the cordless power tool system. The overview provides better context for the example battery charging methodologies described thereafter.

Figure 1:
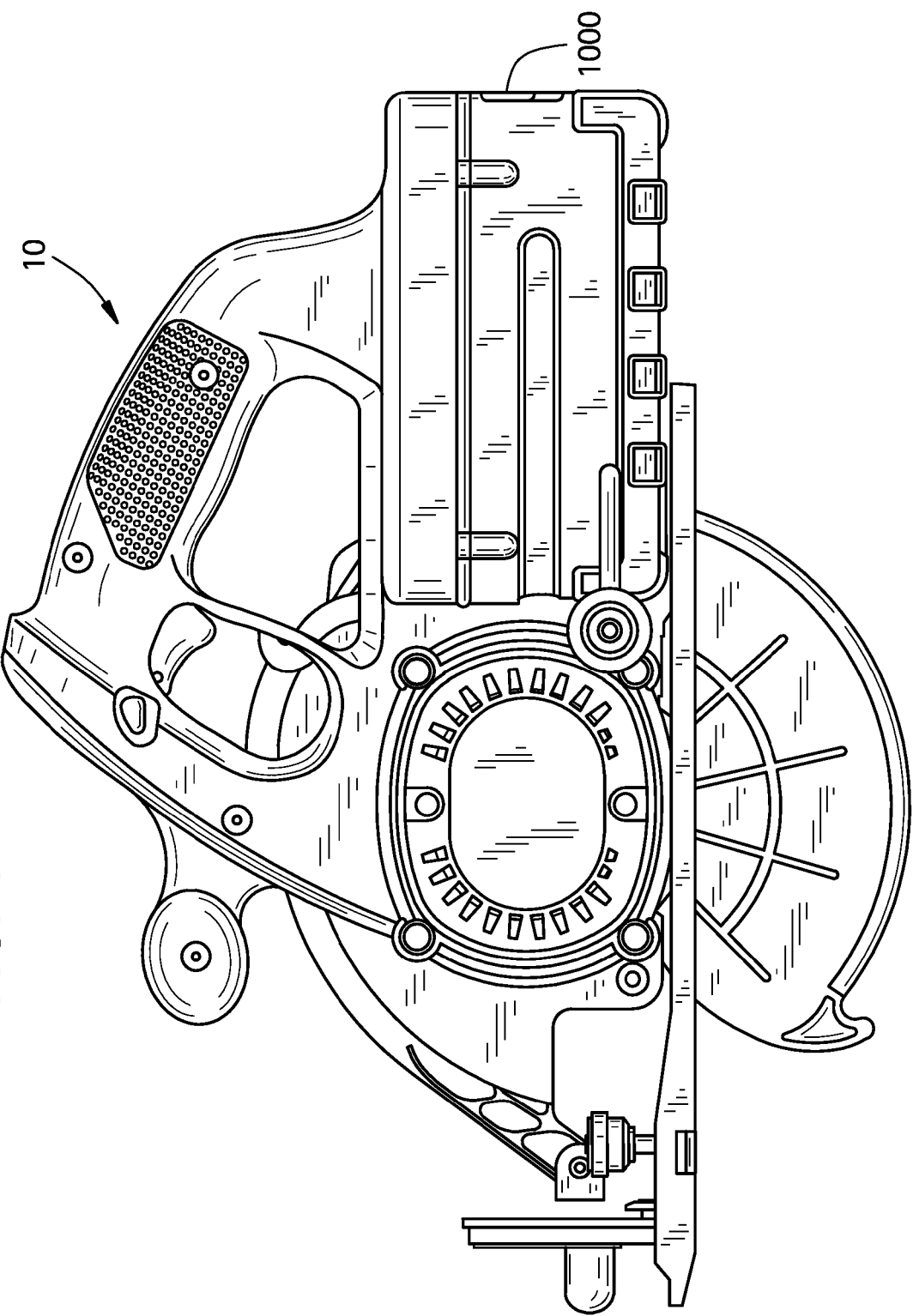
FIGS. 1-3 illustrate illustrative cordless power tools of a cordless power tool system in accordance with example embodiments herein.
Figure 2:
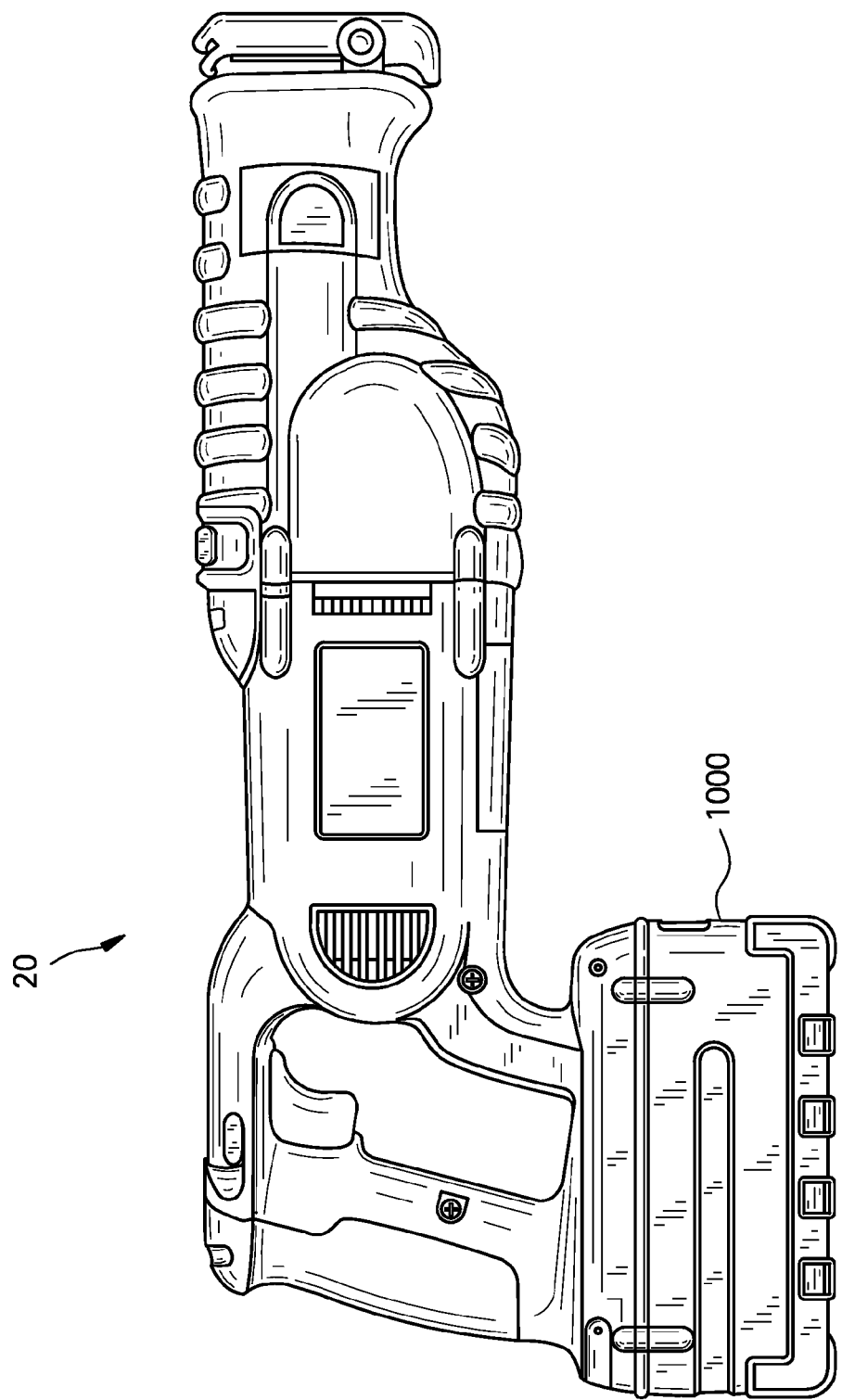
Figure 3:
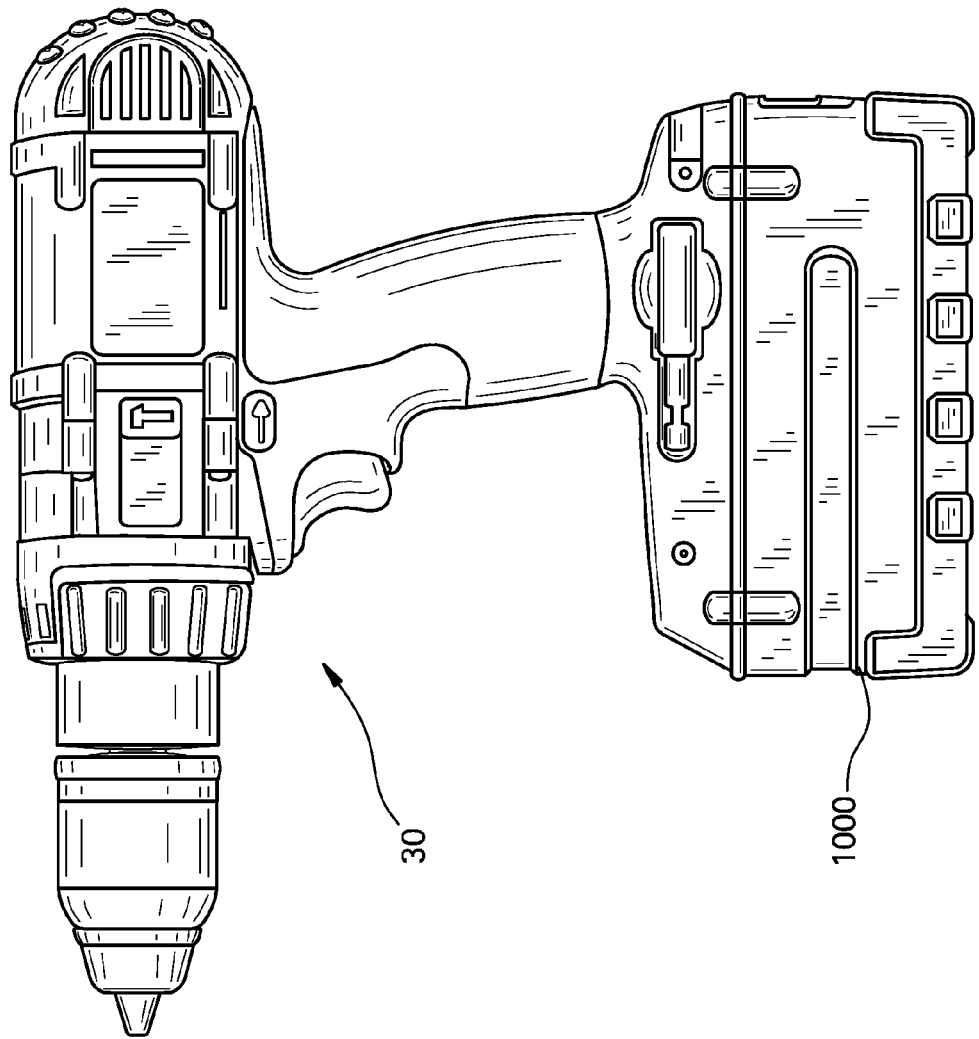

FIGS. 1-3 illustrate illustrative cordless power tools of a cordless power tool system in accordance with an example embodiment of the present invention. The battery charging methods described in further detail hereafter may be employed to charge battery packs designed for powering a system of cordless power tools. Example cordless power tools are shown to include, by way of examples only, a circular power saw 10 (FIG. 1), a reciprocating saw 20 (FIG. 2) and a drill 30 (FIG. 2). The tools 10, 20 and 30 each may include a conventional DC motor (not shown) adapted to be powered by a power source having a given nominal voltage rating.

Tools 10, 20 and 30 may be driven by a removable power source having a nominal voltage rating of at least 18 volts. It will become evident to those skilled that the example embodiments are not limited to the particular types of tools shown in the drawings nor to specific voltages recited herein. In this regard, the teachings of the present invention may be applicable to virtually any type of cordless power tool powered at any supply voltage.

With continued reference to FIGS. 1-3, the removable power source is shown as a battery pack 1000. In the example embodiments illustrated, the battery pack may be a rechargeable battery pack 1000. Battery pack 1000 may include a plurality of battery cells connected in series, and/or a plurality of serially-connected strings of cells, in which the strings are in parallel with one another.

For purposes of describing example embodiments of the present invention, battery pack 1000 may be composed of cells having a lithium-based cell chemistry.

As the example methodologies to be described hereafter are directed to charging battery packs of power tools in a cordless power tool environment, which require power sources having much higher voltage ratings than conventional low voltage devices using Li-ion or Li-based battery cell technology, (such as laptop computers and cellular phones) the nominal voltage rating of the battery pack 1000 is at least 18V.

Figure 4:
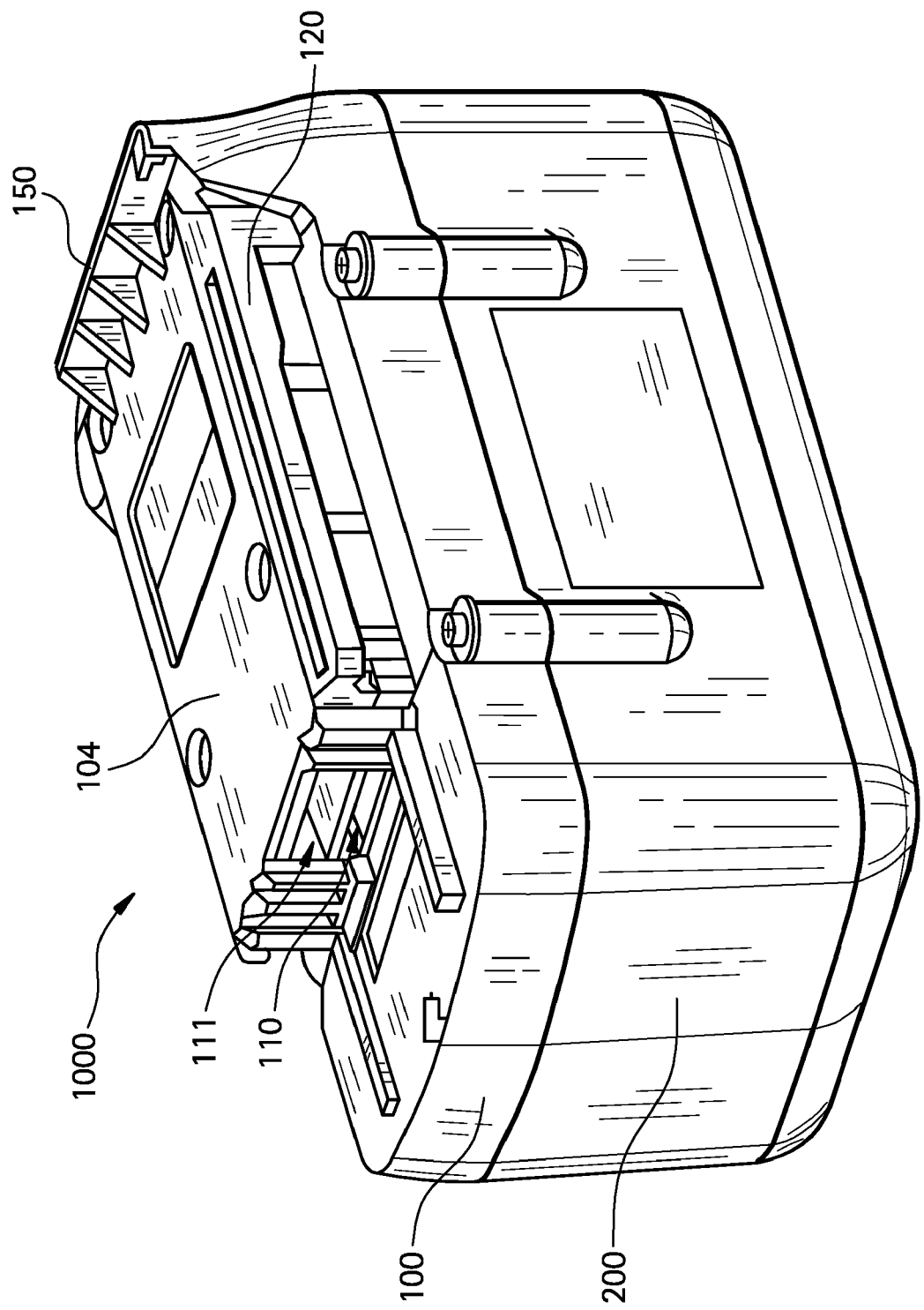
FIG. 4 is a perspective view of a battery pack 1000 adapted for providing power to a cordless power tool such as shown in any of FIGS. 1-3.
Figure 5:
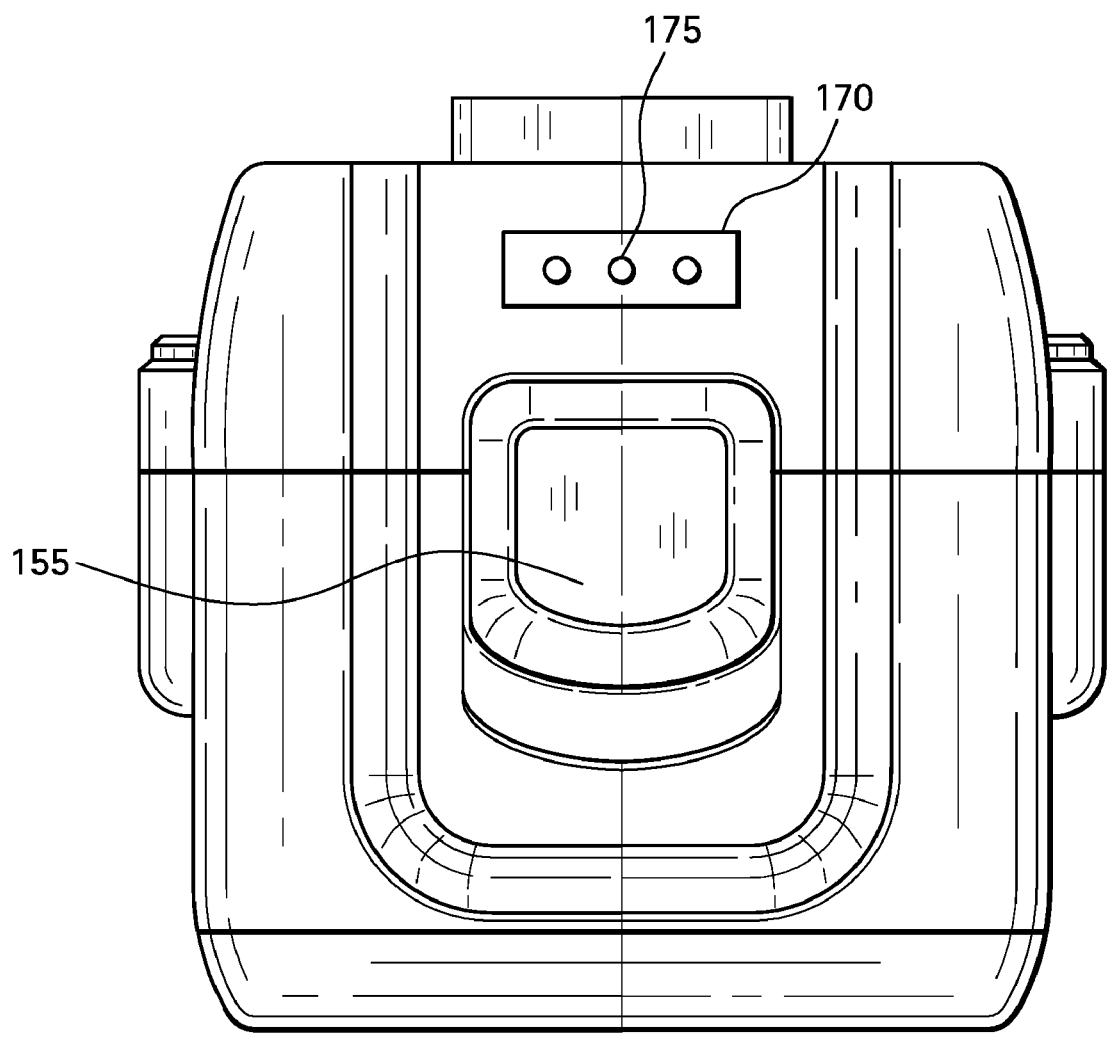
FIG. 5 is a rear view of the battery pack 1000 of FIG. 4.

FIG. 4 is a perspective view of a battery pack adapted for providing power to a cordless power tool such as shown in any of FIGS. 1-3 in accordance with an example embodiment of the present invention, and FIG. 5 is a rear view of the battery pack of FIG. 4. Pack 1000 includes a housing comprising a top housing 100 and a bottom housing 200, joined as shown generally in FIG. 4. The top housing 100 and bottom housing 200 may be each unitarily constructed from a rigid plastic or other suitable material such as ABS.

The top housing 100 includes an upper portion 104 which provides a recessed area on an interior side thereof (not shown) for housing an electronics module therein (not shown for purposes of clarity). The electronics module can include a microcontroller and a plurality of other active components for monitoring parameters in the battery pack 1000, in an attached charger or power tool, etc, and in the cells of the pack 1000. A battery pack terminal block (T-block) 110 is disposed within an opening 111 of top housing 100. The exact terminal or contact configuration of T-block 110 is not a focus of the present invention, thus a detailed description is omitted for purposes of brevity. As is known the T-block 110 interfaces a corresponding terminal block of an attached power tool 10, 20, 30 or battery charger for electrical communication and power flow between the devices, as is known.

Pack 1000 includes a latch 150 configured as a release mechanism for releasing the battery pack 1000 from a power tool or charger. As shown in FIG. 5, an operator can release the battery pack 1000 from the power tool or charger by depressing a latch release button 155 disposed in pack 1000. The latch 150 and release button 155 may be a single integrally-molded piece, for example. A detailed explanation of operation of latch 155 is omitted for brevity, it being understood that the battery pack 1000 can be removed from a power tool or charger by depressing the latch release button 155.

Figure 6:
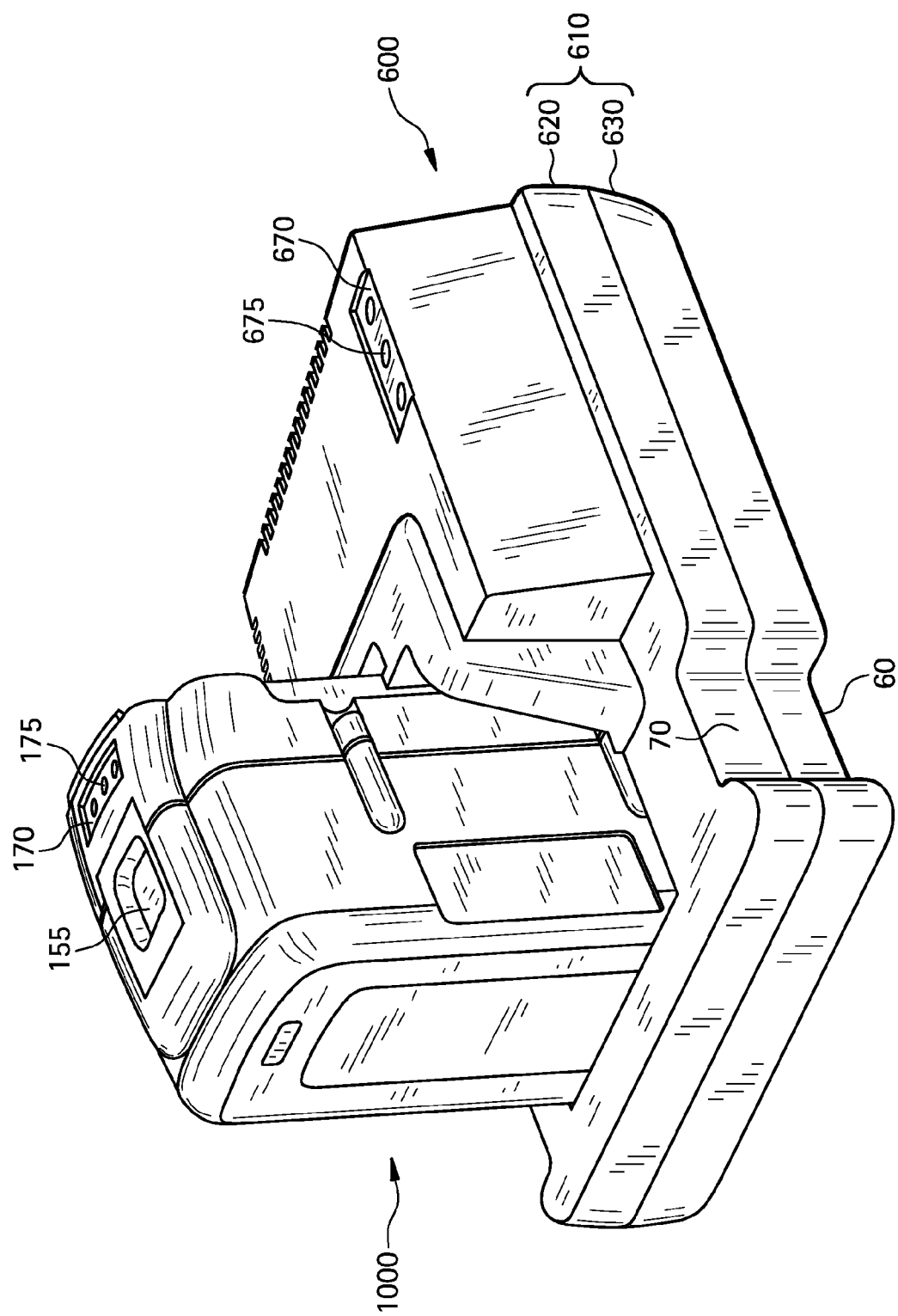
FIG. 6 illustrates the battery pack 1000 inserted into a battery charger 600.

FIG. 6 illustrates the battery pack inserted into a battery charger. The battery charger 600 includes a housing 610 formed by upper and lower housings 620 and 630. A power cord attaching the charger 600 to an AC line power source in charger is not shown. The charger 600 includes an LED display 670 having a plurality of LED lamps 675 thereon ("LED 675"). The LED display 670 can provide an indication that the battery pack 1000 is fully charged by lighting an appropriate LED lamp 675, and/or can indicate a fault or problem with the battery pack 1000 during a charge operation with another LED 675.

Also shown in FIG. 6 is the LED display 170 on pack 1000. The LED display 170 in the battery pack 1000 may be a three LED 175 arrangement as shown in FIG. 5, or a single LED with different color indicators. The LED's 175 can provide state of charge status and/or provide an indication of a problem in the battery pack 1000 during charge and/or discharge operations.

The battery pack 1000 shown herein has a nominal voltage of at least 18 Volts. However, in specific embodiments, the battery pack 1000 can contain a battery cell configuration that provide a output voltage of approximately 36 volts; in another embodiments, the pack can be configured with a plurality of cells that provide a output voltage of approximately 25 volts (25.2 volts).

Figure 7B:
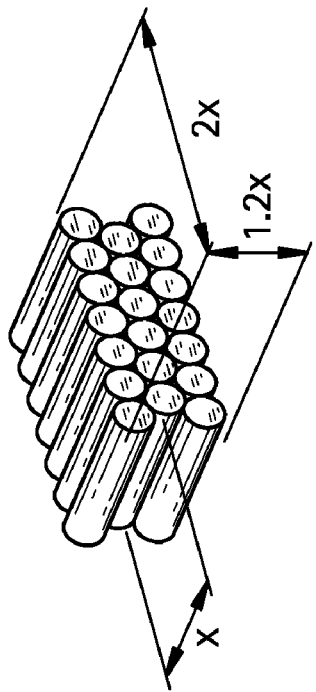
FIGS. 7A and 7B illustrate example cell configurations for a 36V battery pack 1000 in accordance with an example embodiment.
Figure 7A:
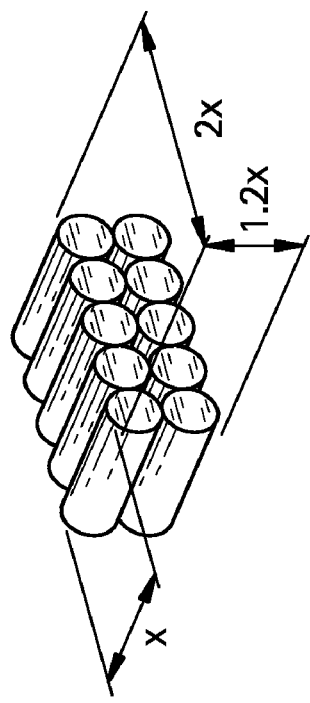

FIGS. 7A and 7B illustrate example cell configurations for a 36V Li-ion pack in accordance with an example embodiment of the present invention. In particular, FIGS. 7A and 7B illustrate alternative cell constructions for a 36V battery pack 1000.

Referring to FIG. 7A, the cell arrangement within pack 1000 may a plurality of 26650 Li-ion cells (each cell 26 mm in diameter and 650 mm in length) in the illustrated cell orientation. FIG. 7A illustrates ten (10) 26650 cells, having a nominal cell voltage of approximately 3.6 V/cell. The 26650 cells may have a Li-ion cell chemistry in one example. This would be a cell chemistry of lithiated cobalt oxide, lithiated nickel oxide, lithiated manganese oxide spinel, and mixtures of the same or other lithiated metal oxides In another example, the 26650 cells may have a lithium metal phosphate cell chemistry. An example is a Li-ion cell having a lithium iron phosphate (LFP) cathode. The active component in the cathode of a cell having this chemistry is the lithiated metal (iron) phosphate. The Li-ion LFP cells may be cylindrically shaped and have a spiral wound or "jelly roll" construction as to the cathode, separators and anode, as is known in the battery cell art. The material of the negative electrode may be a graphitic carbon material on a copper collector or other known anode material, as is known in the lithium-based battery cell art.

Alternatively, the cell arrangement within pack 1000 may comprise twenty (20)18650 Li-ion cells with lithium metal phosphate cell chemistry (each cell 18 mm in diameter and 650 mm in length) in the illustrated cell orientation of FIG. 7B. FIG. 7B shows cells in a 2 parallel, 10 series configuration (2P10S) with a nominal cell voltage of about 3.6 V/cell, so as to achieve a pack voltage of 36V. The pack voltage is approximately 36 V, as volts per cell may vary due to specific chemistry of the lithium-ion based pack. For example, a cell having a lithium iron phosphate (LFP) based-cell chemistry is about 3.3 V/cell nominally, where a cell having a lithium metal oxide based cell chemistry is about 3.6 V/cell nominally.

Figure 8B:
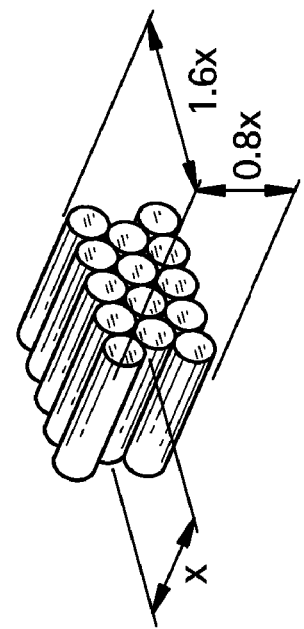
FIGS. 8A and 8B illustrate example cell configurations for a 25.2 battery pack 1000 in accordance with an example embodiment of the present invention.
Figure 8A:
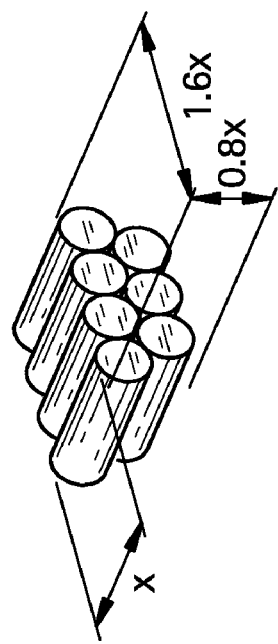

FIGS. 8A and 8B illustrate example cell configurations for pack 1000 as an approximately 25V pack in accordance with an example embodiment of the present invention. Referring to FIG. 8A, the cell arrangement of pack 1000 may comprise seven (7) 26650 Li-ion (oxide-based) or Li-ion (phosphate based) cells in the illustrated cell orientation. Alternatively, the cell arrangement within the pack of FIG. 8B may comprise fourteen (14) 18650 Li-ion (oxide-based) or Li-ion (phosphate based) cells in the illustrated cell orientation. The pack voltage is approximately 25 V, as volts per cell may vary slightly due to specific chemistry of the lithium-ion based pack, as described above.

Volts per cell and the number of cells for the orientation shown in FIGS. 7A-8B may be tailored to the desired total power required of the high power Li-ion battery pack, and may be in a nominal voltage range of about 3.3 to 4.6 V/cell, which may present an acceptable range based on industry electrochemical voltage potential guidelines. Of course these values may vary depending on the charge state of the cells (whether cells are fully charged or not), and on the particular chemistry of the cells.

Figure 9:
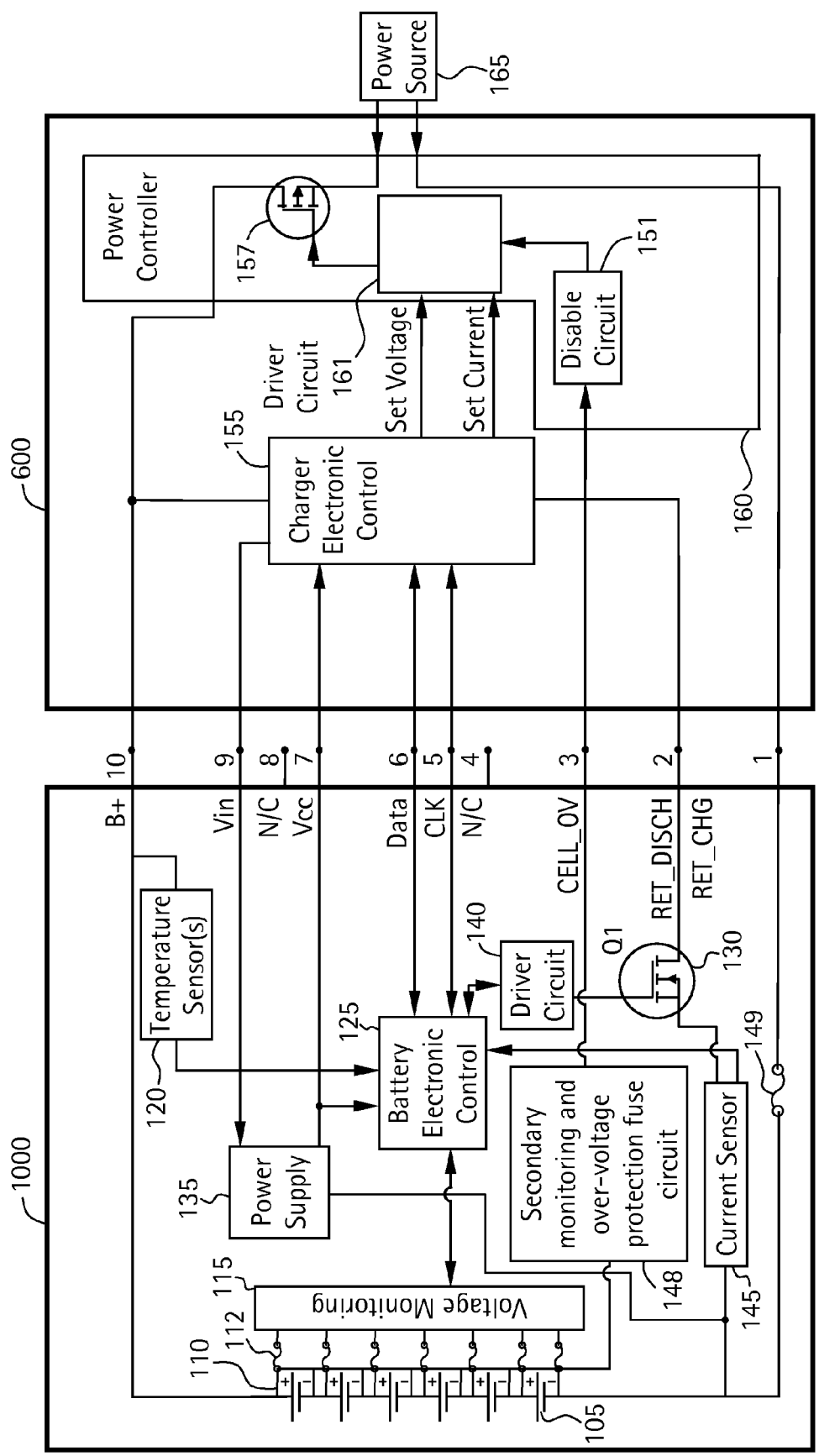
FIG. 9 is a block diagram illustrating internal electronic components and connections between the battery pack 1000 and battery charger 600 in accordance with an example embodiment.

FIG. 9 is a block diagram illustrating internal electronic components and connections between the example battery pack 1000 and example battery charger 600 in accordance with an example embodiment. In FIG. 7, ten terminal connections (terminals 1-10) are shown. However, the example embodiments should not be limited to this terminal configuration, as more or less terminals could be included depending on the desired information passed between, or parameters monitored by the pack 1000 or charger 600.

A battery electronic control unit 125 may be responsible for the protection of the cells 105 for any fault condition exposed on the terminals by the user (via charger 600, an attached tool, and/or due to user tampering). The battery electronic control unit 125 may be powered by an internal power supply 135 as shown.

The battery electronic control unit 125 may be embodied in hardware or software as a digital microcontroller, a microprocessor or an analog circuit, a digital signal processor or by one or more digital ICs such as application specific integrated circuits (ASICs), for example. The battery electronic control unit 125 may include various types of memory that may execute one or more software or firmware programs. Example memory may include RAM, FLASH and EEPROM. As an example, RAM may be used to store program variables during run time. As an example, FLASH memory may be used to store program code and calibration values. EEPROM may also be provided to store calibration values, data logging information, error codes, etc. Hereafter, battery electronic control unit 125 is embodied as a microcontroller and referred to as a "controller 125" for purposes of brevity.

The discharge current in battery pack 1000 may be clamped or discontinued by the use of semiconductor device 130 (discharge FET) under the control of controller 125 so as to control current to a tool motor in any of the tools shown in FIGS. 1-3. The controller 125 can be powered by an internal power supply 135 as shown, and controls the ON/OFF state of discharge FET 130 through a driver circuit 140. In general, the controller 125 controls the switching of discharge FET 130 via the driver circuit 140 so as to selectively control the average voltage applied to the tool motor, thus controlling at least one of power and current output from the battery pack 1000.

In FIG. 9, six (6) cells 105 are shown connected in series, it being understood that this is only for exemplary purposes, additional cells could be shown in series or in a series-parallel relationship as is described herein. When pack 1000 is connected to charger 600, the charging of battery cells 105 is controlled by the controller 125 implementing an exemplary charge methodology and communicating over data lines to the charger 600. By placing the charge FET 157 within the charger 600 instead of within pack 1000, both space and power dissipation (heat) may be moved from the compact battery pack 1000 to the charger 600.

Battery pack 1000 may further include a current sensor 145 which senses current and provides a signal to controller 125. Current sensor 145 may be embodied by known components for current sensors, such as a shunt resistor, current transformer, etc. which may provide a signal representing sensed current in pack 1000 to controller 125.

Pack 1000 may also include voltage monitoring circuitry to monitor voltage of the cells, such as voltage monitoring unit 115. A detailed example is described as a battery monitoring arrangement 200 in detail in co-pending and commonly assigned U.S. patent application Ser. No. 11/239,286 to Carrier et al. (U.S. Patent App. Publication No. 2006/0071643 A1), filed Sep. 30, 2005 in the U.S. Patent & Trademark Office and entitled" METHOD AND DEVICE FOR MONITORING BATTERY CELLS OF A BATTERY PACK AND METHOD AND ARRANGEMENT FOR BALANCING BATTERY CELL VOLTAGES DURING CHARGE, (hereafter the '286 application) the entire contents of which are hereby incorporated by reference.

In general the voltage monitoring unit 115 is configured to sense individual cell voltage and sense total pack voltage of the string of cells 105 ('stack voltage') to provide a signal representing the individual cell or stack voltage to controller 125. As described in the '286 application, the voltage monitoring unit 115 is part of an integrated circuit to take, singly or sequentially, a sampled reading comprising one of an individual cell voltage or a total stack voltage for all cells in the pack. The sampled reading is filtered in the integrated circuit prior to being read by the controller 125.

In an example, and as described in more detail in the '286 application, the controller 125 directs voltage monitoring unit 115 to periodically measure, throughout the duration of a charging operation between pack 1000 and charger 600, the cell voltage across each cell of the pack and the total pack voltage in a sequential manner. The measured individual cell voltages and a current average cell voltage for all cells are sent by the voltage monitoring unit 115 to the controller 125. The measured total pack voltage is automatically divided by the number of cells within the pack to determine the current average cell voltage.

The controller 125 can control balancing of each of the cell voltages during a battery charge ('cell balancing') based in part on each measured individual cell voltage and the determined current average cell voltage. Cell balancing is known in the art, thus a detailed explanation is omitted. However, as shown and described in FIG. 1 of the '286 application, in order to balance cells 105 within pack 1000 one or more individual cells 105 can be discharged during a charging evolution to reduce the voltage of the cell. In general, controller 125 gives a command to the voltage monitoring unit 115 which drives gate drive circuitry to switch a given semiconductor device (FET) in a semiconductor device stack to either ON or OFF. Each cell 105 has a balance FET and a balance resistor. A given balance FET is controlled to switch its corresponding balance resistor in or out of the cell's current path in order to drain (discharge) a specific current from the cell set by the value of the balance resistor. This lowers the cell's voltage.

Thus, a cell's balance resistor can be switched into the current path of the cell 105 when its corresponding balance FET is turned on, to discharge that cell 105 so as to reduce the cell voltage during the charging evolution. The controller 125 controls balancing of the cells 105 during charging operations based on measured individual cell voltages to cycle balance FETs on and off based on the particular charge algorithm being implemented by the controller 125.

The pack 1000 may further include one or more temperature sensors 120. Temperature sensors 120 may be embodied as NTC or PTC thermistors, temperature sensing integrated circuits, or thermocouples, for example. The temperature sensors 120 may communicate the temperature inside the battery pack 1000 or inside individual cells (collectively 'pack temperature") to controller 125 in the battery pack 1000 and/or to intelligence in the connected charger 600, for example, via terminal 10 to charger electronic control 155. As the function of such temperature sensors 120 are known, a detailed explanation of functional operation is omitted for purposes of brevity.

Optionally, the pack 1000 may be provided with its own identification (ID), if communicating with another intelligent device such as a charger. microprocessor or a tool microprocessor. A pack ID (not shown), if desired, may be embodied by an ID resistor, an additional LED display (not shown) that displays identification data of the pack, serial identification data sent upon engagement and sensed by a tool/charger connected to pack 1000 via data and clock terminals 5 and 6 for example, and/or a field in an frame of data sent over an air interface to the tool/charger, etc.

Pack 1000 may include auxiliary internal protection circuits or devices including a secondary monitoring and over-voltage protection fuse circuit 148 and a charge fuse 149 in the return charge line from charger 600. The secondary monitoring and over-voltage protection fuse circuit 148 separately monitors the voltage of each cell (in addition to voltage monitoring unit 115) to detect any cell 105 (one or some or all cells) which reaches an over-voltage condition during charge. In such a case, the secondary monitoring and over-voltage protection fuse circuit 148 sends a disable signal directly to the charger 600 to terminate charge current. This provides backup protection in case the cell balancing functionality within the voltage monitoring unit 115 becomes corrupted during charge and/or the voltage monitoring unit 115 becomes inoperative.

The charge fuse 149 acts as a tertiary protection device to blow in the case that both cell balancing (voltage monitoring unit 115) and secondary over-voltage protection measures from circuit 148 become inoperative and/or fail to detect a cell over-voltage condition for whatever reason. Once charge fuse 149 blows, charge and discharge is permanently disabled within pack 1000.

When battery pack 1000 is connected to charger 600, the charger electronic control unit 155 in the charger 600 may be powered from the battery's internal power supply 135 through terminal 9. This is only an example connection scheme, as other means for powering the charger electronic control unit 155 can be employed. The charger 600 could have its own supply or derive it directly from the battery voltage. The charger electronic control unit 155 may also be embodied in hardware or software as a digital microcontroller, microprocessor, analog circuit, digital signal processor, or by one or more digital ICs such as application specific integrated circuits (ASICs), for example. The charger electronic control unit 155 may drive a power controller 160 via a driver circuit 161 with a set voltage and a set current to deliver the desired voltage and current from a power source 165 to the battery pack 1000 via terminals 1 and 10.

Battery and charger data and control information may be exchanged through serial data paths on terminals 5 and 6. For example, terminals 5 and 6 could be used to provide charger ID data and other information to the controller 125. Such information may include, but is not limited to, the digital ID of the charger, the charger current, total stack voltage of the cells as read by the charger, temperature conditions of the charger, AC mains level of the charger 600, etc. In an example, any problem the charger 600 senses during its diagnostic testing can be communicated to the controller 125 through serial data paths on terminals 5 and 6. In another example, if the controller 125 receives a charger fault such as low AC mains, the controller 125 can generate an error message to the charger 600 and/or wait before resuming charging, for example. Moreover, based on the fault information and Charger ID data, the controller 125 can control the charger output and/or control charging decisions for its cells based on the charger data. Commands to the charger 600 then may be issued. In any event, the charge methodologies to be described hereafter are implemented and controlled in the battery pack 1000 and not in the charger 600.

An overview of the example cordless power tool system inclusive of example power tools, battery pack 1000 and charger 600 having been described, the inventors introduce a lithium metal phosphate cell chemistry for battery pack 1000 and charging methods for charging a Li-ion battery pack 1000 having lithium metal phosphate cells.

Lithium Metal Phosphate Technology for Li-ion Battery packs

A lithium-ion cell design using phosphate technology is fundamentally different from conventional lithium ion cell design using metal oxide. Therefore, the inventors have developed different charge methods for packs having an olivine lithium-metal phosphate cell chemistry than are used for charging conventional Li-ion battery packs.

The use of a lithium-metal phosphate cell chemistry such as lithium-iron phosphate ($LiFeO_4$, referred to in the industry as 'LFP')) in a Li-ion battery pack, in contrast to an oxide-based Li-ion chemistry such as the lithium cobalt oxide ($LiCoO_2$) cells currently used in Li-ion batteries or battery packs, is that a lithium-metal phosphate cells offer more stability, since a lithium-metal phosphate does not easily release oxygen. In addition, cathode manufacturer costs may be significantly reduced by using lithium-metal phosphate cell chemistries. Lithium-metal phosphate cells such as LFP cells have a lower operating voltage than $LiCoO_2$ cells and a flatter discharge profile.

The lithiated metal phosphate electrode typically transfers 100% of the lithium ions to the carbon electrode. The conventional lithiated metal oxide transfers roughly 50% of the lithium ions to the carbon electrode. More lithium ions can be transferred if overcharged, resulting in lithium metal plating. The conventional Li-ion cells are designed such that 50% of the lithium ions remain with the metal oxide, so as to stabilize the crystal structure.

The conventional Li-ion cell, especially containing cobalt or nickel, is charged at constant current until the first cell reaches a specific absolute voltage with a tight tolerance, for example 4.15V+/−0.005. Thereafter, the cells are held at a tight constant voltage (CC/CV). However, as will be explained below in accordance with the example embodiments, Li-ion (LFP) cells can be charged by other methods than the conventional CC/CV charge.

As will be seen in more detail hereafter, the example charge methods take advantage of the 100% Li ion transfer features of lithium metal phosphate by charging to a voltage range or within an acceptable voltage window, instead of charging to a tightly toleranced absolute voltage that is required for conventional lithium ion cells. The conventional CC/CV charge requires sophisticated electronic control and voltage referencing.

For the example charge methods, the voltage window can be as wide as 0.4V, with an example window being 0.2V (200 mV window), for example between 3.6V to 3.8V during the constant current charge. There is no need for a second stage constant voltage charge upon one cell reaching a voltage threshold or setpoint. Thus, all cells can be fully charged without having to resort to holding cells at a tight constant voltage until end of charge after the first cell reaches a voltage threshold, as is required for conventional CC/CV charge algorithms.

The example methods may be applicable to charging battery pack 1000 of cells having a lithium metal phosphate chemistry such as LFP. In the examples described hereafter, pack 1000 consists of 10 cells, each having a nominal cell voltage of about 3.3 V/cell and fully charged voltage of 3.6 V/cell. The example charge methodologies may thus be directed to charging a 10-cell pack of size 26650 cells, such as a serial string of 10 cells for example, it being understood that example methodology could be applied to any number of cells at a different cell size, in a serial/parallel configuration and/or at a different nominal or max volts per cell rating.

The following example charge methodologies take advantage of the 100% Li-ion transfer features of lithium metal phosphate by charging to a voltage range or within an acceptable voltage window, instead of charging to a tightly toleranced absolute voltage required of conventional Li-ion cells.

Charge Methodology Using Voltage Window—Example 1

An example charge criteria for multi-cell Li-ion battery pack (such as 10 serially-connected cells and/or cells in a 2 parallel, 10 series configuration (2P10S)) having, in this example, a lithium metal phosphate cell chemistry such as LFP is to charge the cells within an allowable voltage window up to a maximum individual cell voltage of 3.8V, and continue the charge until all cells are above some minimum, such as 3.6V, thus achieving 100% charge on all cells. Cell balancing can be performed for those cells that first reach 3.8V in the event that some cells do not reach 3.6V minimum. Cell balancing may be performed as described in the '286 application.

The difference in capacity of a cell that is charged to 3.8V and a cell charged to 3.6V top of charge is only 0.1 Ah or less because of the characteristic voltage polarization at 100% state of charge. Charging to a voltage window minimizes time at a high charge voltage, thus shortening overall charge time.

Figure 10:
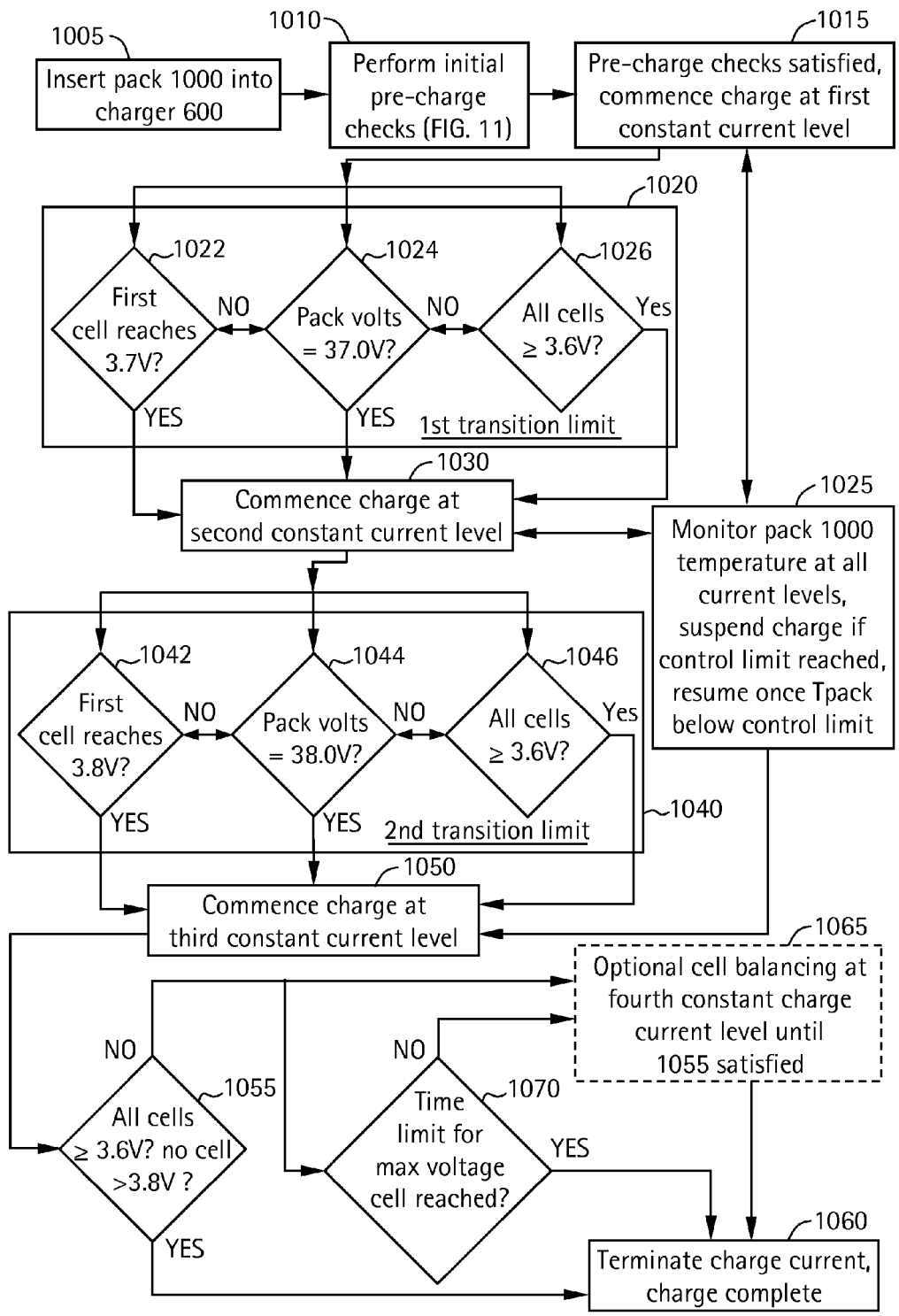
FIG. 10 is a flowchart for illustrating a charge methodology for charging a Li-ion pack 1000 having a plurality of Li-ion cells with a lithium metal phosphate cell chemistry.

FIG. 10 is a flowchart for illustrating a charge methodology for charging a Li-ion pack 1000 having a plurality of Li-ion cells with a lithium metal phosphate cell chemistry. In this example, pack 1000 is comprised of ten (10) serially-connected cells (cell tolerances +/−0.05V). These cells may have a LFP cell chemistry or another lithium metal phosphate cell chemistry, for example.

For the following methodology, voltage monitoring to measure individual cell and/or total pack voltage may be performed as generally described above by voltage monitoring unit 115 and as described in more detail in the '286 application. Temperature monitoring of cells may be via controller 125 in the pack 1000 receiving cell or pack temperature data from temperature sensors 120 such as thermistors placed in the pack 1000.

Thus, overall charge control and invoking of any overcharge protection mechanisms is provided by controller 125. As an example, the controller 125 can receive a battery temperature value from an internal NTC thermistor (temperature sensor 120) and communicate this information via serial data paths to a charger electronic control unit 155 in the charger 600. In the event of an extreme battery temperature, such as a hot or cold pack delay condition to be described hereafter, the charge current is suspended by controller 125 issuing a suitable control signal via serial data paths to the charger electronic control unit 155 to turn off charge FET 157 in the charger 600.

Referring now to FIG. 10, pack 1000 is inserted (1005) into charger 600 and certain initial conditions should be satisfied, such as pack temperature being less than 50° C. and all cells having voltages above 2.0V. These initial conditions are merely exemplary for charging a battery pack 1000 with LFP cells and should not be considered limitative as to the example methodologies described herein.

Figure 11:
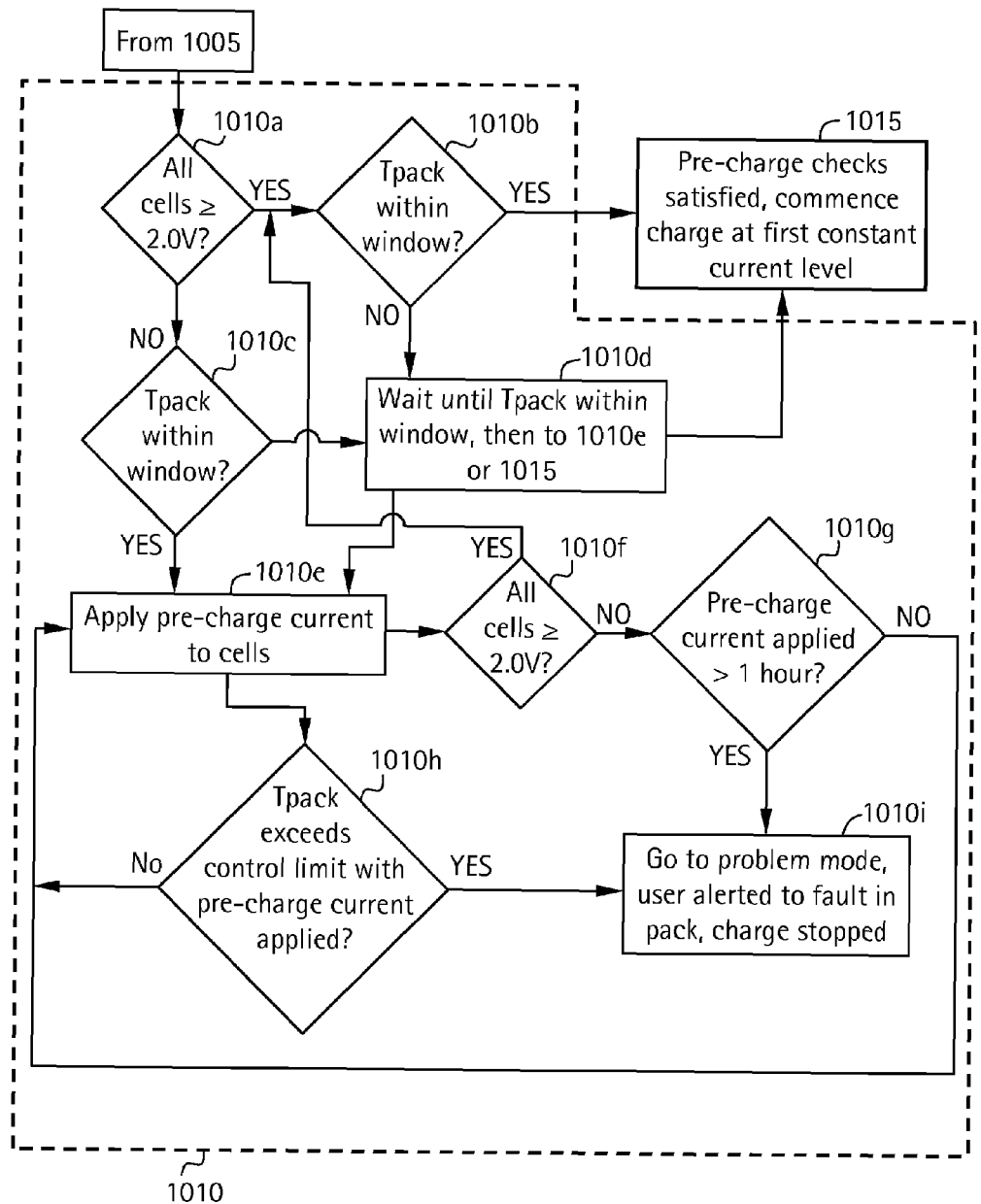
FIG. 11 is a flowchart illustrating pre-charge checks performed by the example charge methodology of FIG. 10 in further detail.

Accordingly, a series of pre-charge voltage and temperature checks (1010) are performed by the charge algorithm implemented by controller 125. This is described with reference to FIG. 11. In FIG. 11, the charge algorithm checks that all cell voltages are above 2.0V (or pack voltage above 20V) at 1010*a* and that pack temperature is within a temperature window of between −0° C. to 50° C. at 1010*b*. If both of these checks are satisfied, the charge can commence at the first constant current level (1015). This command information can be communicated from controller 125 via serial data paths to the charger electronic control unit 155 in the charger 600. If temperature is outside this window (output of 1010*b* or 1010*c* is NO), no charge current will be applied until pack temperature is within the window (at 1010*d*).

If cell voltage of any of the cells is <2.0V (and temperature is verified within the window at 1010*c*) controller 125 directs the charger 600 via a suitable command over serial data paths to apply a pre-charge current to the cells (1010*e*) until all cell voltages are above 2.0V (output of 1010*f* is 'YES'), or the pre-charge current has been applied for 1 hour. The pre-charge current applied may be a current<200 mA, for example.

The charge algorithm invokes a problem mode (at 1010*i*) if pack temperature exceeds a control limit (such as Tpack exceeding 60° C., output of 1010*h* is 'YES') as the small pre-charge current applied. The problem mode is also invoked if the small pre-charge-current has been applied for greater than 1 hour and cell voltages are still not above 2.0V, (output of 1010*g* is 'YES'). The problem mode can be indicated to the user bay a specified blinking pattern of the LEDs 675 on the charger 600, or a specified blinking pattern of LEDs 175 on the pack 1000. In an example, the three LEDs 675/175 can blink in unison at a specified frequency to indicate a problem in the pack 1000 to a user.

Otherwise, if all cell voltages are above 2.0V and pack temperature is within the temperature window, the initial pre-charge checks are satisfied and a constant level charge current is applied (1015) to all cells. In an example, this first constant current level is a current of 3.0 A.

Referring to FIG. 10, individual cell and total pack voltage is continuously monitored by voltage monitoring unit 115 throughout the charge. Additionally, controller 125 continuously monitors pack temperature throughout the charge via temperature sensors 120 (thermistors). Additionally, the charge may be suspended at any point that the control limit (pack temperature (Tpack) exceeding 60° C.) is exceeded, and resumed once Tpack has fallen below the control limit (see 1025).

The cells are charged at the first constant current level until a first transition limit is reached at 1020. A first transition limit is reached if any of 1022, 1024 or 1026 is satisfied. The double arrows in FIG. 10 shown between steps 1022, 1024 and 1026 indicates that all three conditions (first cell to reach 3.7V or pack voltage=37V or all cells≧3.6V) are being evaluated by the charge algorithm implemented by controller 125, based on the individual and total pack voltage measurements being interpreted by controller 125. Any of these conditions, if satisfied, triggers a step change reduction in charge current to a second constant current level (at 1030). In an example, the second constant current level is half of the first, or 1.5 A.

The cells are charged at the second constant current level until a second transition limit is reached at 1040. As before, the second transition limit is reached if any of 1042, 1044 or 1046 is satisfied. The double arrows between steps 1042, 1044 and 1046 indicate that all three conditions are being evaluated by the charge algorithm implemented by controller 125, based on the individual and total pack voltage measurements being interpreted by controller 125. Any of these conditions, if satisfied, triggers a step change reduction in current to a third constant current level at 1050. In an example, the third constant current level is half of the second, or 0.75 A.

At the third constant current level, the charge algorithm determines (at 1055) whether all cells are ≧3.6V and no cell is >3.8V. In other words, the algorithm is verifying that cell voltages of all the cells are within a full charge voltage window between a minimum full charge cell voltage level and a maximum full charge cell voltage level. If this is satisfied (output of 1055 is 'YES'), charge current is terminated (1060). This may be done via a suitable termination command sent by controller 125.

If this is not satisfied, then the algorithm checks whether the maximum voltage cell has been above 3.6V for a set time duration with the third charge current being applied thereto (1070). For example, this time limit may be 60 minutes or greater. If the cell having the maximum voltage has been at or 3.6V for an hour (output of 1070 is 'YES'), the charge is then terminated. The charge terminates even if all cells are not above 3.6V at the expiration of the time limit at this point in the charge.

Optionally, if neither of steps 1055 and 1070 is satisfied, cell balancing may be selectively performed (1065). Further current steps may not be needed to achieve higher capacity. Cell balancing may be used to discharge higher voltage cells in order to wait for cells below 3.6V to charge to above 3.6V. In this example, cell balancing might be done if voltage differential between any 2 cells being charged at this third constant current level is >0.5 V. Accordingly, higher voltage cells can be discharged by turning on the balance FETs of those cells, switching the balance resistor into the cells' current path. Other cells can be charged at a reduced fourth constant current level until step 1055 is satisfied, such that there is no voltage differential above 0.20V. In an example, the fourth constant current level can be a charge current applied at 0.25 A or less to achieve balance as needed. As always, pack temperature is continuously monitored to ensure that the control limit is not exceeded, which would cause suspension of the charge until Tpack falls back below the control limit.

Accordingly, a fundamental difference between a Li-ion cell with a lithium metal phosphate cell chemistry such as LFP, as compared to the conventional Li-ion (oxide) cell chemistry, is that cells with a lithium metal phosphate cell chemistry permit full charge without the constant volt step that is necessary for full charge of a conventional Li-ion battery pack. In the above example, it may be possible to charge a Li-ion battery pack consisting of cells having a lithium metal phosphate cell chemistry such as LFP at a single constant current, e.g., the reduced second and third constant current steps, 1.5 A and/or 0.75 A could be optional. If the pack is charged at a lower current on the first step, 1.5 A for example, then the charge might be equivalent to a 2-step 3.0 A/1.5 A. An alternate approach can include charging at a first step of high constant current (3 A or greater), then immediately dropping down to 100 mA for cell balancing.

The example charge methodology could be applicable to battery packs with cells having metal phosphate formulations other than lithium-iron phosphate (LFP), such as lithium manganese phosphate, lithium vanadium phosphate, lithium cobalt phosphate, lithium nickel phosphate, or any mixtures of same, all of the olivine structure. A desired or optimum charge voltage window may be slightly different for each formulation, but may be within a range of about 3.6V to 4.2V per cell.

The voltage window approach for charging cells simplifies the measurement accuracy requirement of a single cell, and reduces the need for cell balancing and/or the frequency of cell balancing. All cells in the pack can achieve full charge (3.6V) while allowing one or more of the other cells to charge to a higher voltage (3.8V, for example). This charge method which employs a voltage window does not significantly reduce lithium metal phosphate cell performance, as compared to performance obtained with a conventional Li-ion CC/CV charge method.

Charge Methodology Using Voltage Window—Example 2

Figure 12:
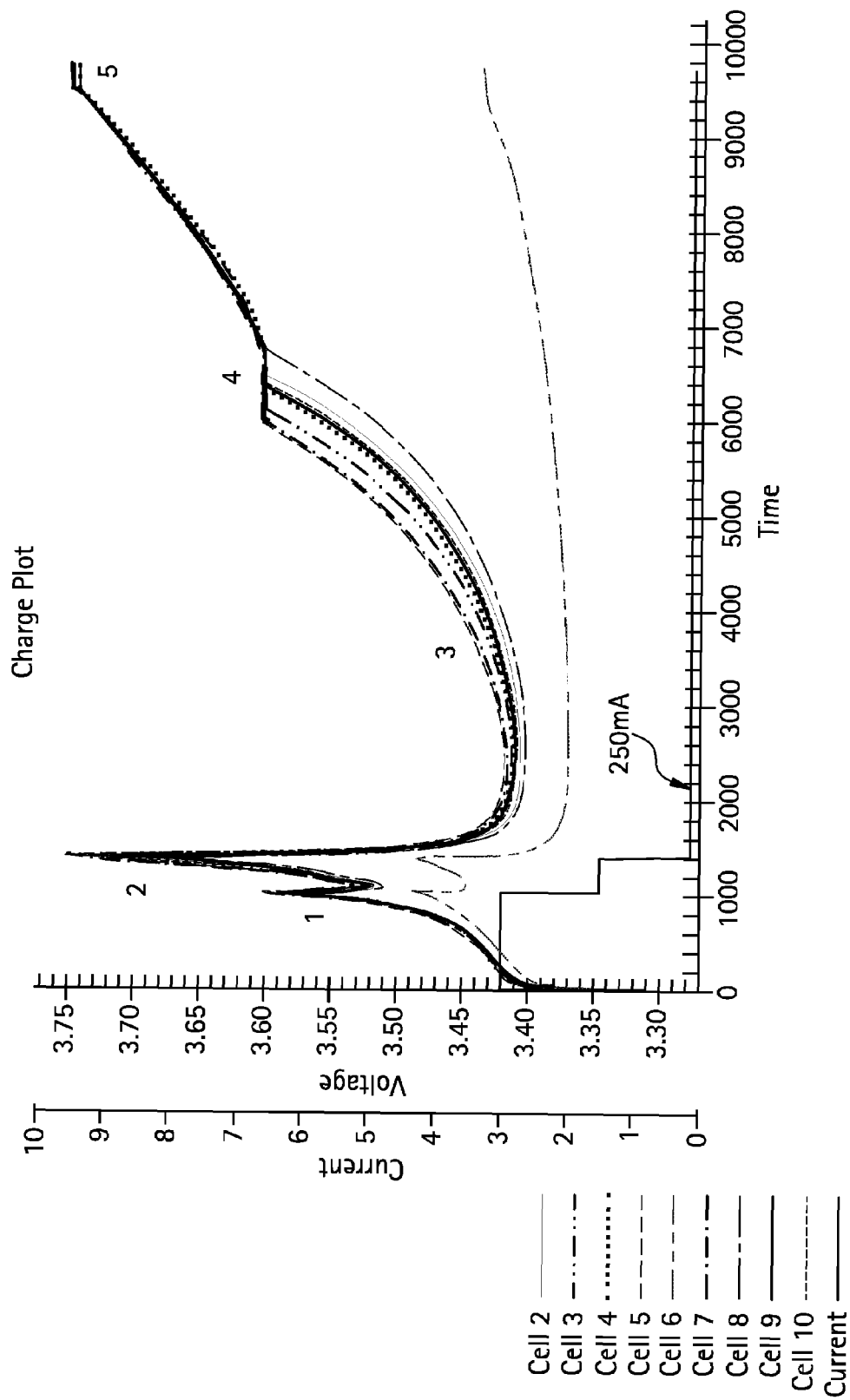
FIG. 12 is a charge plot to illustrate voltage profiles for battery pack 1000 and charge current over the duration of another example charge methodology.

FIG. 12 is a charge plot to illustrate voltage profiles for battery pack 1000 and charge current over the duration of another example charge methodology. Charge current (amps) and voltage (volts) are shown as a function of charge time (seconds) in FIG. 12. FIG. 12 is labeled with regions 1-5 to assist with explanation of certain functions performed during this example charge. This example methodology is similar to the example shown in FIGS. 10 and 11; only differences are explained in detail below. As with Example 1, this charge methodology is described for charging a multi-cell Li-ion battery pack having a lithium metal phosphate cell chemistry (10 serially-connected cells and/or cells in a 2 parallel, 10 series configuration (2P10S)), with voltage monitoring of individual cell and/or total pack voltage and cell balancing performed as described in the '286 application. The cell arrangement and cell chemistry described herein is only exemplary; the following charge methodology could be applied to a battery pack having a different number of cells and/or different cell chemistry. As in FIGS. 10 and 11, control of the charge is provided by controller 125 in pack 1000.

Referring to FIG. 12, initially as the pack 1000 is inserted into the charger 600, charge current is set to 0 amps and temperature limits are checked for hot and cold temperature thresholds. Application of any charge current is delayed until pack temperature is within limits. For example, if pack temp>60 C, then the charge is delayed due to a hot pack delay condition; if pack temp<−10 C then the charge is delayed due to a cold pack delay condition.

Also at pack 1000 insertion into the charger 600, voltage checks are made before any initial charge current is applied. As a pre-condition with charge current at 0 amps, if the minimum cell voltage is not ≧0.4 volts within 30 seconds after pack 1000 insertion, then the charge algorithm goes into a problem mode as described in FIG. 11. For example, in the problem mode, current is turned off (as directed by the controller 125) and a problem mode alert is indicated (such as the blinking pattern of LEDs 675/175 on one of the charger 600 or pack 1000) to the end user.

After initial temperature and voltage checks have been satisfied upon pack insertion into the charger, an initial charge current is set to 125 milliamps (0.125 A) and multiple second checks are performed by controller 125 at this initial charge current in accordance with the charge algorithm at this small initial charge current level. For example, the following second set of checks are performed by controller 125, and the following actions taken in accordance with the charge algorithm:

i if minimum cell voltage is not ≧1.6 volts within 6 minutes from commencement of the application of the 0.125 A initial charge current, then goto problem mode (see FIG. 11, step 1010*i*);

ii if (maximum cell voltage−minimum cell voltage)>2.0V then goto problem mode;

iii if maximum cell voltage>3.75V, then charge complete, terminate charge current;

iv if pack temp>60 C then hot pack delay; if pack temp<−10 C then cold pack delay; in either case resume charge current of 0.125 A once within temperature window.

If none of (i) through (iv) are applicable, then the normal charge commences at a first constant current level once the following current ramp test is performed. Proceeding to the maximum charge current may be done incrementally at beginning of charge, such as by initiating the charge (pack 1000 insertion into charger 600) at some lower current, and arbitrarily incrementing current (stepping up in current) while monitoring cell voltages until a cell reaches some voltage threshold (≧threshold) in order to prevent an extended voltage overshoot at beginning of charge. As the current is being incremented, a short duration voltage overshoot may be permitted followed by a decrement in current. For example, a pack 1000 that is fully charged and inserted into the charger 600 may reach some voltage threshold (i.e., ≧3.8V) before the charge current has been incremented to the maximum current level. The charge current would then be stepped down one level so that the cells would be below the voltage threshold. In this case, charging would commence at a lower charge current than the maximum charge current level. In another case, a pack 1000 that does not reach some voltage threshold (i.e., ≧3.8V) during current incrementing would have a time to maximum charge current of 3.0 amps in typically no more than several seconds from time of pack 1000 insertion; this is transparent to the end-user.

Alternatively, instead of meeting or exceeding a voltage threshold in the earliest stage of charge, charge current may be dropped at some cell voltage level slightly below threshold so as to never exceed voltage threshold while attempting to raise current to a max charge current value of 3.0 A.

Referring to region 1 in FIG. 12, charge current is set to a constant 3 A (much higher relative to the initial charge current used for the second set of checks) and individual cell voltage and total pack voltage are continuously monitored, as well as pack temperature. Somewhat similar to FIG. 10, charge is delayed or interrupted if a control limit is exceeded. However, in this example, the control limit may be represented as the upper and lower bounds of the temperature window; pack temperature must remain in this window (−10° C. to +60° C.) during charge. If not, charge current is interrupted by controller 125 sending a signal to the charger 600 until pack temperature is back within the temperature window.

A first transition limit is reached at the first charge current level where a maximum cell voltage of the cells is ≧3.6V. At this point, assuming pack temperature is within the temperature window, charge current is reduced to a second constant current level, in this example 1.5 A. The same checks for temperature are performed as described above; pack temperature must remain within the temperature window of −10° C. to +60° C. during charge.

Referring now to region 2 in FIG. 12, a second transition limit is reached at the second charge current level where a maximum cell voltage of the cells is ≧3.75V. At this point, assuming pack temperature is within the temperature window, charge current is reduced to a third constant current level, in this example 250 mA.

Functions of the charge algorithm at this third constant current level are explained with reference to regions 3, 4 and 5 in FIG. 12. As charge current is reduced to a constant 250 mA, individual cell voltages are being continuously monitored by voltage monitoring unit 115. Additionally in regions 3 and 4, selective cell balancing is performed in order to ensure that cell voltages of all cells are within a full charge voltage window of between about 3.6 to 3.75 volts.

For example, in region 3 of FIG. 12, shown where cell voltages of one or more cells is <3.6V then the charge algorithm directs controller 125 to turn the cells' corresponding balance resistors off (cycle its balance FETs off) so that the cells can continue to charge to 3.6 volts at the 250 mA charge current (at region 4). Once at region 4, if a cell voltage≧3.6V, then turn that cell's corresponding balance resistor on to discharge the cell. These functions may thus be performed to balance cell voltages towards the end of charge.

The same checks for temperature are performed as described above—pack temperature must remain in the temperature window (−10° C. to +60° C.) during the charging at 250 mA. Additionally, at this point in the charge the charge algorithm does additional continuous checks for a voltage differential between the cells in pack 1000 having the highest and lowest voltage levels. This may represent another control limit that is imposed toward end-of-charge. If (maximum cell voltage−minimum cell voltage)>2.0V then the algorithm invokes the problem mode to alert the user and charge current is terminated.

Alternatively, the charge methodology performed in regions 3 and 4 of FIG. 12 could be replaced with the following balancing method. Those cells equal to the maximum cell voltage during the 250 mA 'balance region' (in regions 3, 4) would have their corresponding balance resistors turned on to discharge those cells. When the maximum cell voltage exceeds a threshold (i.e.' 3.8V) then charge current is set to 0 A and charging is completed (region 5). Alternatively, if the maximum cell voltage is less then a voltage threshold (such as: 3.8V) and the minimum cell voltage is greater than a minimum voltage threshold (such as 3.6V) then charge current is set to 0 A and charging is complete (region 5). In region 5, there are multiple indicators that a charge is complete.

A charge is complete (and the 250 mA charge current is terminated) if controller 125 determines that (a) the maximum individual cell voltage of all the cells≧3.75 volts; or (b) the minimum individual cell voltage of all the cells≧3.6 volts, or (c) if the cell having the maximum cell voltage in the pack has been at a voltage greater than 3.6 volts for a fixed duration of time (such as 40 minutes) at the third constant current level (i.e., within regions 3 and 4 of FIG. 12).

The example embodiments being thus described, it will be obvious that the same may be varied in many ways. Such variations are not to be regarded as departure from the spirit and scope of the example embodiments, and all such modifications as would be obvious to one skilled in the art are intended to be included within the scope of the appended claims.

What is claimed:

1. A method of charging a battery pack having a plurality of battery cells, comprising:
   inserting the battery pack into a charger,
   performing an initial set of checks of cell voltage and pack temperature,
   charging the cells at a first substantially constant current level once the initial set of checks are satisfied,
   adjusting the first constant current level to one or more lower levels of substantially constant current until cell voltages of all the cells are within a full charge voltage window between a minimum full charge cell voltage level and a maximum full charge cell voltage level wherein during the charge, after the initial set of checks are performed, all of the subsequent change levels applied to the cells are substantially constant charge levels and are lower than the immediately proceeding substantially constant current level except if the charge is interrupted, then the substantially constant current level following the interruption is brought to the substantially constant current level immediately before the interruption, and terminating the charge once all cells are within the full charge voltage window.

2. The method of claim 1, wherein the cells are not held at a substantially constant voltage level for a fixed duration to allow current to gradually decrease to complete the charge, upon one or more of the cells reaching a given voltage setpoint during the charge.

3. The method of claim 1, wherein adjusting the constant current level further includes:

determining whether a first charge current transition limit has being reached, and reducing charge current to a substantially second constant current level lower than the first upon reaching the first transition limit, determining whether a second charge current transition limit being reached, and reducing charge current to a substantially third constant current level lower than the second upon reaching the second transition limit.

4. The method of claim 1, wherein determining whether the first and second transition limits have been reached includes monitoring individual cell and total pack voltage throughout the charge.

5. The method of claim 1, further comprising:

monitoring pack temperature throughout the charge to determine if a control limit based on high pack temperature has been reached, interrupting the charge if the control limit has been reached or exceeded, and resuming the charge once monitored pack temperature has fallen below the control limit.

6. The method of claim 1, wherein performing an initial set of checks of cell voltage and pack temperature includes, checking that pack temperature is within a temperature window between minimum and maximum temperature limits and delaying charging the cells at the first substantially constant current level until pack temperature is within the temperature window, and checking that all initial individual cell voltages are above a cell low voltage threshold, where if one or more cell voltages are below the cell low voltage threshold, pre-charging the cells at a charge current less than 200 mA until all initial cell voltages exceed the low voltage threshold, wherein the initial set of checks are satisfied with pack temperature within the temperature window and no cell voltage below the cell low voltage threshold.

7. The method of claim 3, wherein the first transition limit is reached if an individual cell reaches 3.7 volts or total pack voltage reaches 37.0 volts, and the second transition limit is reached if an individual cell reaches 3.8 volts, cell voltage of all cells is $\geq$3.6 volts, or total pack voltage reaches 38.0 volts.

8. The method of claim 7, further comprising:

selectively balancing individual cells that reach 3.8 volts during charging at the third substantially constant current level by discharging those cells reaching 3.8V during charging at the third constant substantially current level, until all cells have reached or exceeded 3.6 volts.

9. The method of claim 1, wherein terminating charge further includes terminating the charge once all cells are within the full charge voltage window and a voltage differential between any of the cells is 0.20 or less.

10. The method of claim 3, wherein the first transition limit is reached if an individual cell reaches 3.6 volts, and the second transition limit is reached if an individual cell reaches 3.75 volts.

11. The method of claim 10, further comprising:

selectively discharging individual cells with a cell voltage$\geq$3.6 volts and continuing to charge cells with a cell voltage<3.6 voltage at the third substantially constant current level, and terminating the charge further includes terminating the charge once all cells are within the full charge voltage window or once a cell having the maximum cell voltage in the pack is greater than a given voltage level for a fixed duration of time at the third substantially constant current level.

12. The method of claim 11, wherein terminating charge includes securing charge current to the cells at the third substantially constant current level if the maximum individual cell voltage of all the cells$\geq$3.75 volts, or if the minimum individual cell voltage of all the cells$\geq$3.6 volts, or if the cell in the pack having the maximum cell voltage in the pack has been at a voltage greater than 3.6 volts for 40 minutes.

13. The method of claim 1, wherein the plurality of cells have a lithium metal phosphate cell chemistry.

14. The method of claim 13, wherein the battery pack of lithium metal phosphate cells is configured to provide an output voltage of at least 18 volts.

15. A method of charging a battery pack having a plurality of battery cells, comprising:

inserting the battery pack into a charger, performing an initial set of checks of cell voltage and pack temperature with zero charge current, charging the cells at an initial charge current level once the initial set of checks is satisfied to perform a second set of voltage and temperature checks, charging the cells at a first substantially constant current level once the second set of checks is satisfied, the first substantially constant current level being substantially higher relative to the initial charge current level used for the second checks, reducing charge current to a second substantially constant current level lower than the first upon reaching a first transition limit, reducing charge current to a third substantially constant current level lower than the second upon reaching a second transition limit, selectively discharging individual cells while continuing to charge other cells at the third substantially constant current level wherein during the charge, after the second set of checks is satisfied, all of the subsequent change levels applied to the cells are substantially constant charge levels and are lower than the immediately proceeding substantially constant current level except if the charge is interrupted, then the substantially constant current level following the interruption is brought to the substantially constant current level immediately before the interruption, and terminating the charge once all cells are within a full charge voltage window between a minimum full charge cell voltage level and a maximum full charge cell voltage level.

16. The method of claim 15, wherein pack voltage is not maintained at a constant voltage level once a cell reaches a given voltage setpoint, as the current gradually decreases to a lower level so as to complete the charge.

17. The method of claim 15, wherein the first transition limit is reached if an individual cell reaches 3.6 volts, and the second transition limit is reached if an individual cell reaches 3.75 volts.

18. The method of claim 17, wherein terminating the charge further includes terminating the charge once all cells are within the full charge voltage window or once a cell having the maximum cell voltage in the pack is greater than a given voltage level for a fixed duration of time at the third substantially constant current level.

19. The method of claim 18, wherein terminating charge includes securing charge current to the cells at the third substantially constant current level if the maximum individual cell voltage of all the cells$\geqq$3.75 volts, or if the minimum individual cell voltage of all the cells$\geqq$3.6 volts, or if the cell having the maximum cell voltage in the pack has been at a voltage greater than 3.6 volts for 40 minutes at the third substantially constant current level.

20. The method of claim 15, wherein the plurality of cells have a lithium metal phosphate cell chemistry.

* * * * *

UNITED STATES PATENT AND TRADEMARK OFFICE
CERTIFICATE OF CORRECTION

PATENT NO. : 7,656,131 B2  Page 1 of 1
APPLICATION NO. : 11/553742
DATED : February 2, 2010
INVENTOR(S) : Janet M. Embrey et al.

It is certified that error appears in the above-identified patent and that said Letters Patent is hereby corrected as shown below:

Column 15,
Line 4, "change" should be -- charge --.
Line 6, "proceeding" should be -- preceding --.

Column 16,
Line 60, "change" should be -- charge --.
Line 62, "proceeding" should be -- preceding --.

Signed and Sealed this

Twentieth Day of April, 2010

David J. Kappos
*Director of the United States Patent and Trademark Office*